Figure 1:
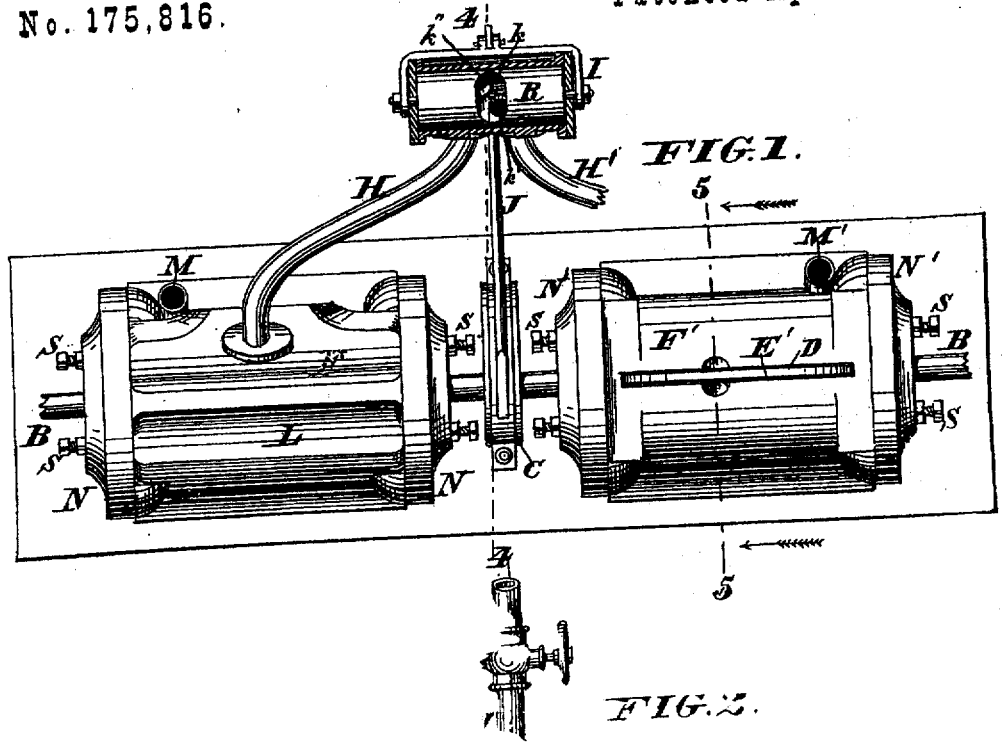

H. BAYLISS & W. F. WELLS.
ROTARY-ENGINE.

No. 175,816.  Patented April 11, 1876.

WITNESSES
F. E. Smith

INVENTORS
Harris Bayliss
William F. Wells

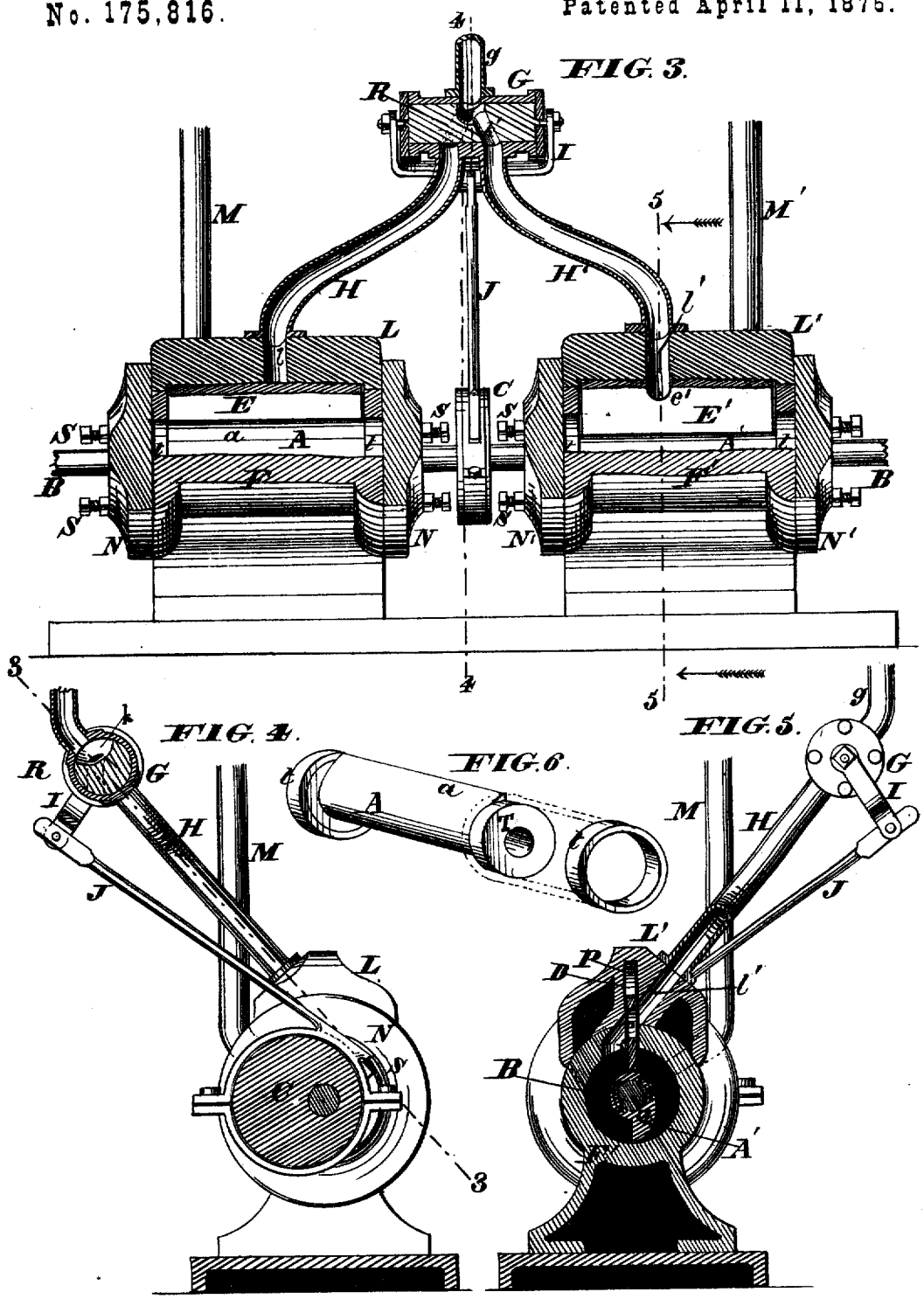

UNITED STATES PATENT OFFICE.

HARRIS BAYLISS AND WILLIAM F. WELLS, OF CLEBURNE, TEXAS.

IMPROVEMENT IN ROTARY ENGINES.

Specification forming part of Letters Patent No. 175,816, dated April 11, 1876; application filed July 30, 1875.

*To all whom it may concern:*

Be it known that we, HARRIS BAYLISS and WILLIAM F. WELLS, of Cleburne, in the county of Johnson and State of Texas, have invented an Improved Rotary Engine, of which the following is a specification:

This improvement relates to double rotary engines having sliding abutments or gates, said gates being operated to open and close the steam-pipes alternately, so as to overcome dead-points.

The invention consists, first, in the combination of two distinct and separate cylinders, a single solid shaft running lengthwise through the center of the same, and coupling two cammed pistons, and an eccentric applied to the shaft between the inner heads of the cylinders, and adapted to operate, by means of a rod, a single oscillating valve, supplying steam to both cylinders alternately, in keeping with the movements of the abutments. The object of this improvement is to arrange the cylinders in such a position that the inner as well as the outer heads of the cylinders can be detached for the purpose of inserting the packing-rings. It also provides space for turning the set-screws in taking up wear of the rings.

The invention consists, secondly, in coupled and cammed pistons, which press out abutments or gates extending the whole length of the wings, for alternately cutting off the supply of steam from the pipes, and having a single orifice or perforation in each abutment or gate, corresponding to the diameter of the supply-pipe, in combination with a spring for returning said abutments or gates, so as to bring the orifices in line with said supply-pipes. The object of this improvement is to provide an engine of this kind with a cut-off of very simple construction, being merely a plate sliding in a slot and provided with an orifice equal in size to a transverse section of the supply-pipe.

The improvement consists, thirdly, in constructing one side of each cylinder with longitudinal slots, to permit the gates to reciprocate therein, and an orifice to conduct the steam from the pipes into the interior of the cylinder, in combination with removable cylinder-caps having corresponding slots and orifices, and pipes attached thereto, conducting the steam from a single valve. The object of this improvement is to bring the steam in a more direct manner to play upon the cammed pistons. The gates can be easily got at by removing the caps.

The invention consists, fourthly, in a steam-chest of peculiar construction, having an oscillating or reversing valve, provided with central apertures of Y shape, forming the entrance and exit ports, to direct the steam into branching pipes, alternately, leading one to each cylinder, in combination with an eccentric centrally located between the cylinders. The object of this improvement is to provide a simple valve for dividing the steam equally to each cylinder alternately. The supply of steam is not cut off in entering the steam-chest, but switched to one or the other cylinder alternately.

Figure 2:
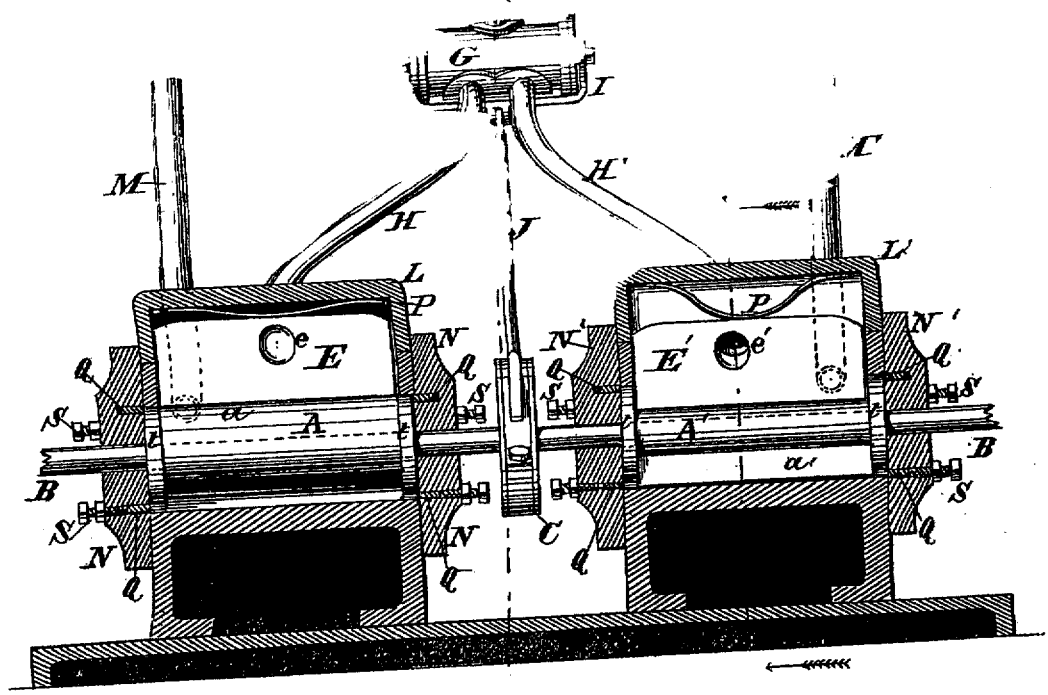

In the accompanying drawing, Figure 1 is a plan, partly in section, of a rotary engine illustrating the invention. Fig. 2 is a vertical longitudinal section of the same. Fig. 3 is a longitudinal section taken obliquely on the line 3, Fig. 4. Fig. 4 is a transverse section on the line 4, Figs. 1, 2, and 3. Fig. 5 is a transverse section on the line 5, Figs. 1, 2, and 3. Fig. 6 is a perspective view of the piston detached, and one of the head-rings removed.

A A' represent two cammed pistons, keyed upon a common shaft, B, which carries at its central part an eccentric, C, operating the valve, as hereinafter described. The pistons rotate within cylinders F F', each of which has at its upper side a vertical longitudinal slot, D, to receive sliding abutments or gates E E', which abutments are pressed downward by springs P, in contact with the periphery of the cammed rotary pistons A A'. G is a steam-chest, common to both cylinders, receiving steam at $g$, and communicating with the respective cylinders F F' through pipes H H', the lower parts of which are fastened, by coupling flanges and bolts, to the caps L L' of the cylinders F F', in which the sliding abutments E E' work. R is an oscillating valve, receiving motion within the steam-chest G by means of a yoke, I, and rod J, connecting with the eccentric C. The valve is so constructed, and the operating parts are so arranged, that steam will be admitted to the pipes H H', and will be cut off from either pipe, and the cylinder connected therewith, during the period that the pressure-wings $a\ a'$ of the said pistons are passing the sliding abutments. M M' are exhaust-pipes, through which steam escapes from the cylinders alternately. In each of the heads N N' of the cylinders are longitudinally-sliding rings Q, which are pressed inward by means of set-screws S, in close contact with rings $t$, surrounding the heads T of the cammed pistons A A', so as to form a steam-tight packing. The valve R has Y-shaped apertures, forming the entrance-port $k$ and exit-ports $k'\ k''$. The abutments or gates E E' are provided with orifices $e\ e'$ of the diameter of the supply-pipes H H'. The cylinder-caps L L' are each provided with a single slot, D, and orifices $l\ l'$. The orifices $l\ l'$ convey the steam directly to the cylinders. These caps are preferably excavated on each side, and are attached in such a manner as to be easily removed.

Operation: Steam being admitted into the steam-chest G, at $g$, will pass through the port $k$ into the valve R, and out through the port $k''$, through the pipe H and cylinder L, directly to the cylinder F, acting on the pressure-wing $a$ of the cammed piston A, and rotating the shaft in the direction indicated by the arrow, the sliding abutment E being in position for the steam to expand against it, and continuing in the same position until just before the pressure-wing $a$ of the piston reaches the escape-pipe M, when the abutment E, being pressed out, closes the orifice $e$, and cuts off the steam from orifice $l$. The eccentric C, at the same time, reverses the cut-off valve R, and throws the steam into the cylinder F' through the port $k'$, pipe H', orifices $l'$ and $e'$. As soon as the steam escapes from the cylinder F through the pipe M, the sliding abutment E comes into position without friction to receive the steam again, so as to keep up a continuous uniform motion and do away with dead-points.

The following is what we claim as new and desire to secure by Letters Patent:

1. The combination of a pair of detached cylinders, F F', single solid shaft B, coupled and cammed pistons A A', and eccentric C, applied to the shaft between the inner ends of said cylinders, and adapted to operate, by means of a rod, J, a single oscillating valve, R, for both cylinders, substantially as and for the purpose set forth.

2. The coupled and cammed pistons A A', arranged to press out the abutments or gates E E', for alternately cutting off the supply of steam from the pipes H H', and having single orifices or perforations $e\ e'$, in combination with the springs P, for returning the said abutments, so as to bring said orifices in line with said supply-pipes, as set forth.

3. The cylinder sides having longitudinal slots D, for the passage of the abutments E E', and orifices $e\ e'$, in combination with the removable cylinder-caps L L', having corresponding slots D and orifices $l\ l'$, and the pipes H H' attached thereto, and conducting the steam from the single valve R, as set forth.

4. The oscillating or reversing valve R, having the central Y apertures or ports $k\ k'\ k''$, and operating to direct the steam into the branching pipes H H' of the cylinders F F', in combination with the eccentric C, centrally located between the inner heads of the cylinders, rod J, and yoke I, as set forth.

HARRIS BAYLISS.
WILLIAM F. WELLS.

Witnesses:
  C. Y. KOUNS,
  H. W. BARCLAY.